(12) United States Patent
Bürstner et al.

(10) Patent No.: US 9,412,483 B2
(45) Date of Patent: Aug. 9, 2016

(54) COMPOSITE WIRE AND CONTACT ELEMENT

(71) Applicant: Feindrahtwerk Adolf Edelhoff GmbH & Co. KG, Iserlohn (DE)

(72) Inventors: Gerhard Bürstner, Schwerte (DE); Mathias Fiolka, Hemer (DE)

(73) Assignee: Feindrahtwerk Adolf Edelhoff GmbH & Co. KG, Iserlohn (DE)

( * ) Notice: Subject to any disclaimer, the term of this patent is extended or adjusted under 35 U.S.C. 154(b) by 118 days.

(21) Appl. No.: 14/278,626

(22) Filed: May 15, 2014

(65) Prior Publication Data

US 2014/0353030 A1  Dec. 4, 2014

(30) Foreign Application Priority Data

May 29, 2013 (DE) ................ 20 2013 004 915 U

(51) Int. Cl.
*H01B 1/02* (2006.01)
*H02G 15/02* (2006.01)
*H01B 5/02* (2006.01)

(52) U.S. Cl.
CPC ............ *H01B 1/026* (2013.01); *H02G 15/02* (2013.01); *D07B 2201/2011* (2013.01); *D07B 2205/3067* (2013.01); *D07B 2205/3085* (2013.01); *D07B 2205/3089* (2013.01); *H01B 5/02* (2013.01); *Y10T 428/1291* (2015.01); *Y10T 428/12535* (2015.01); *Y10T 428/12556* (2015.01); *Y10T 428/12715* (2015.01); *Y10T 428/12889* (2015.01); *Y10T 428/12896* (2015.01); *Y10T 428/12924* (2015.01)

(58) Field of Classification Search
CPC .............................. H01B 1/026; H02G 15/02
USPC ........ 174/74 R; 428/677, 647, 624, 621, 673, 428/672, 675
See application file for complete search history.

(56) References Cited

U.S. PATENT DOCUMENTS 4,227,061 A      10/1980  Westfall et al.
4,837,416 A  *   6/1989   Yamamoto ............... B23H 7/08
                                                      219/69.12

(Continued)

FOREIGN PATENT DOCUMENTS

| CA | 1312126 C | * | 12/1992 |
| EP | 1191545 A1 | * | 3/2002 |
| JP | 2005053092 A | * | 3/2005 |
| KR | 2007075516 A | * | 7/2007 |

OTHER PUBLICATIONS

"Equation of state and electrical conductivity of stainless steel", Mattsson, Sandia Report SAND 2004-5253, Printed Nov. 2004, section 2.3.*

*Primary Examiner* — Timothy Thompson
*Assistant Examiner* — Charles Pizzuto
(74) *Attorney, Agent, or Firm* — Scully Scott Murphy and Presser

(57) ABSTRACT

A contact element is provided. The contact element has a composite wire. The composite wire has a core made of steel or a steel alloy, a copper alloy layer surrounding the core and a metallic coating applied to the copper alloy layer. The contact element is configured as a connecting wire, a connection wire, a cable wire, a cable strand, a plug-in pin for plug connectors, a weaving wire, a woven wire mesh, a knitted wire mesh or a spring element.

13 Claims, 1 Drawing Sheet

(56) References Cited

U.S. PATENT DOCUMENTS 5,149,508 A * 9/1992 Bullock ............ B01D 53/9454
                                                    392/479

2009/0095796 A1 * 4/2009 Prakash ................... F17C 1/06
                                                    228/184
2013/0306352 A2 * 11/2013 Terashima ................ C22C 5/02
                                                    174/126.2

* cited by examiner

COMPOSITE WIRE AND CONTACT ELEMENT

BACKGROUND OF THE INVENTION

Apart from pure copper materials, materials composed of bronze or brass are frequently also used in electrotechnological and/or mechanical applications.

DISCUSSION OF THE PRIOR ART

Bronze is an alloy of copper and tin; brass is an alloy of copper and zinc. Both materials, i.e. alloys, have mechanical properties or characteristic values for strength and/or elongation which differ from those of copper. In addition, the materials mentioned have different electrical and thermal properties, for example in respect of electrical resistance, transition resistances, thermal conductivity, etc.

There are many different alloy compositions based on the abovementioned alloy elements Cu and Sn or Cu and Zn which can be used in a variety of applications. In particular, the alloy compositions mentioned can be employed in wires, woven meshes, electric and/or mechanical spring elements and other contact elements. In the abovementioned applications, in particular in the case of wires, made of the abovementioned alloy compositions, it would be, inter alia, desirable to be able to provide inexpensive alternatives which are nevertheless approximately functionally equivalent.

SUMMARY OF THE INVENTION

It is therefore an object of the present invention to provide an inexpensive alternative which is largely or at least functionally equivalent to existing bronze or brass wires or contact elements, in particular electric and/or mechanical contact elements.

The present invention is directed to a composite wire which has a core made of steel or a steel alloy, in particular stainless steel, and has at least one copper alloy layer surrounding the core is proposed.

The copper alloy layer is preferably a homogeneous alloy layer, by which is meant, in particular, that the alloy elements are statistically homogeneously distributed in the alloy layer. This is, in particular, the case when the copper alloy layer has been formed from a previously cast and rolled semifinished part and is available in strip form.

As an alternative, the copper alloy layer can be/have been produced by an electrolytic route, i.e. electrochemically. For example, the copper alloy layer can have been/be deposited from a two-component electrolyte, or the copper alloy layer can have been/be produced by the metal diffusion route. When using metal diffusion, the metals Cu and Sn or Cu and Zn can have been/be deposited electrolytically in an appropriate order and frequency, in particular as a layer sequence, with it being possible to use, in particular, one-component electrolytes. In a subsequent heat treatment, formation of the bronze or brass layer can be achieved by metal diffusion. When metal diffusion is used, a concentration gradient of the alloy elements can be obtained, if necessary, when the process is carried out appropriately.

The use of a copper alloy layer enables cost advantages over the use of pure bronze or brass to be achieved.

If a solid bronze or brass layer is replaced by a composite wire as proposed herein, cost advantages are sometimes obtained, in particular since the core of the composite wire consists of a generally cheaper steel wire or a cheaper steel alloy. Only the outer shell of the composite wire comprises copper alloys.

Furthermore, desired or required properties of the composite wire can be set in each case by selection of a suitable copper alloy composition and/or a suitable composition of the steel or the steel alloy. Here, a wider range of possible variation of relevant properties, e.g. electrical, mechanical, thermal and/or chemical properties, can be achieved for the composite wire proposed herein, which, in particular, gives the composite wire a broader use spectrum.

Possible types of steel are, in particular, low-carbon steels, in particular the steel types 1002, 1005, 1006, 1010, or stainless steel, in particular the types 1.4301, 1.4306, 1.4401, 1.4404.

As mentioned above, suitable or required electrical and/or thermal properties can be set or achieved by use of suitable copper alloys for the composition of the copper alloy layer and setting of suitable layer thicknesses.

In embodiments, a copper alloy forming the copper alloy layer or used for the copper alloy can comprise the elements copper and tin as main alloy components or the elements copper and zinc as main alloy components. In the first case, the copper alloy is a bronze and in the second case brass.

Apart from the main alloy elements, the copper alloy can further comprise secondary alloy elements. The secondary alloy elements can be selected according to further requirements, in particular thermal, mechanical and/or electrical requirements, needed in each case.

In embodiments, the composite wire can be a round wire, four-layer wire or flat wire. Composite wires having corresponding cross-sectional shapes can be produced, in particular, by drawing and/or rolling and other suitable processes. In particular, it has been found that the composite wires proposed herein can be worked and processed by means of conventional final working processes as a result of the thermally adhering sheathing/copper alloy layer.

The ability to use previously known final working processes and final working processes is particularly advantageous with a view to the costs of the composite wires and contact elements produced therefrom, in particular electrical and/or mechanical contact elements.

In embodiments, composite wire proposed herein having a copper alloy layer of bronze or brass can be additionally provided with further, at least one further, metallic or nonmetallic layer(s). For electronic applications, coatings of tin (Sn), tin alloys, nickel (Ni), silver (Ag), silver alloys, gold (Au) are possible.

Such additional layers or coatings can be used as functional surfaces, in particular in order to obtain good soldering properties and/or defined surface properties, e.g. greater surface hardness and/or abrasion resistance, suitable transition resistances, surface roughnesses, etc. Furthermore, such layers can also be or have been applied for corrosion protection purposes.

Such metallic layers can, in particular, be applied as electrochemically deposited layers.

In embodiments, the composite wire can have, as indicated above, a nonmetallic outer coating. The nonmetallic outer coating preferably comprises a layer of electrically insulating material, of varnish, of organic material and/or of inorganic material. Layers composed of inorganic material can be or have been applied, for example, as tarnishing protection to prevent discoloration.

In embodiments, the copper alloy layer can be configured at least in parts as sheathing surrounding the core. Here, the copper alloy layer can have been applied, for example, by the cladding process, for example as described in U.S. Pat. No. 4,227,061. When carrying out cladding, two metal strips of suitable width and thickness can be brought together around the core of the composite wire from above and below in such a way that they completely enclose the core and can then be crimped together in the absence of air. In the case of cladding, the sheathing together with the core is reduced in diameter in a subsequent drawing operation.

An alternative cladding variant is sheathing of the core using a single copper alloy strip, with the copper alloy strip being welded at the open longitudinal seam; diameter reduction by drawing follows.

In another cladding variant, it is possible to use a copper alloy tube of suitable thickness for sheathing the core and bringing it to a smaller diameter by subsequent drawing.

The three abovementioned variants are known as cladding variants in the art. However, there are also electrochemical alternatives. For example, the copper alloy layer can be/have been configured as brass or bronze layer by electrochemical coating using a two-component electrolyte. The electrolyte can, for example, be a cyanide electrolyte.

As an alternative, the copper alloy can also have been produced by indirect electrochemical means, with various layers, in particular of the main alloy elements or one of the main alloy elements, firstly being applied here electrochemically, as a melt or by sputtering, and the final alloy is or can be produced by thermal diffusion in a subsequent step. In addition, reference is made to what has been said above in respect of metal diffusion.

Copper alloy layers which have been deposited or applied in such a way can, in particular, always be used when the upper layer, i.e. the copper alloy layer, should be only relatively thin compared to the core.

In addition, compared to copper alloy layers which have been applied by cladding, it is possible to produce differences in the tribological properties since bronze or brass layers produced by an electrolytic route have a surface structure which differs from the bronze or brass layer produced by rolling, in particular of a bronze or brass strip.

In embodiments, the core can have been produced from a low-carbon steel. Advantages in respect of, for example, electrical applications can be achieved here. For example, the specific electrical conductivity of low-carbon steel, e.g. of the type 1006, of about 8.3 m/ohm mm$^2$ is virtually identical to that of a CuSn6 bronze, so that a composite wire of the type proposed herein and based on the appropriate bronze can be used as, in particular in respect of the electrical conductivity, an adequate replacement for all-bronze wires.

In embodiments, it can be provided that the specific electrical conductivity of the core in the case of low-carbon grades is in the range from 7 m/ohm mm$^2$ to 10 m/ohm mm$^2$, in particular about 8 m/ohm mm$^2$. In the case of stainless steel grades, which have higher strengths compared to low-carbon steels, the specific electrical conductivity is preferably in the range from about 1 m/ohm mm$^2$ to 2 m/ohm mm$^2$.

According to another aspect of the invention, a contact element, in particular an electric and/or mechanical contact element, which comprises a composite wire as described above is proposed.

The electric and/or mechanical contact element can, for example, be in the form of connecting wire, connection wire, cable wire, cable strand, plug-in pin for plug connectors, weaving wire, wire braid, woven wire mesh, knitted wire mesh and/or spring element.

Advantages of the proposed contact element result, in particular, from the advantages of the composite wire proposed herein, including embodiments thereof.

BRIEF DESCRIPTION OF THE DRAWINGS

The invention is illustrated with the aid of an example concerning a composite wire in combination with the accompanying figures. The figures show.

DETAILED DESCRIPTION OF THE DRAWINGS

Figure 1:
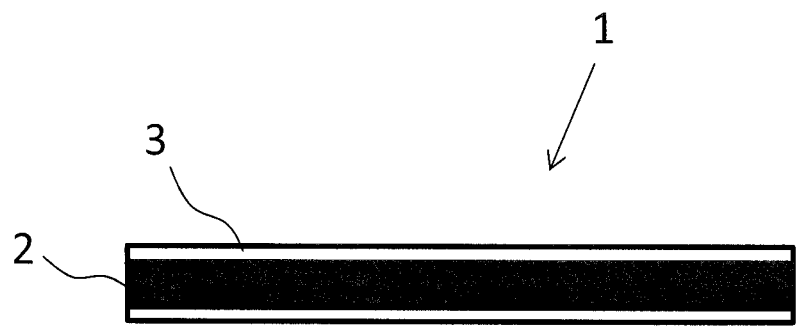
FIG. 1 a longitudinal section through a piece of a composite wire proposed herein as per a first embodiment.
Figure 2:
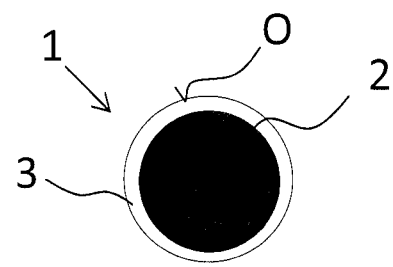
FIG. 2 a cross section of the composite wire of FIG. 1.

FIG. 1 shows a longitudinal section of a piece of a composite wire 1 as proposed herein as per a first embodiment. FIG. 2 shows the cross section of the composite wire 1.

The composite wire 1 comprises a core 2 made of steel or a steel alloy and a copper alloy layer 3 surrounding the core 2.

The copper alloy layer 3 is sheathing which has been applied to the core 2 in a mechanical process (known as cladding).

As an alternative, it is also possible, as described above, for the copper alloy layer to have been formed by electrochemical deposition, melt coating or sputtering of the core with subsequent metal diffusion.

Cost advantages can be achieved by means of the proposed composite wire compared to wires which consist entirely of copper alloys, in particular bronze or brass. This is due, in particular, to cost advantages of steel or steel alloys, which is associated with part, namely the core, of the comparatively costly copper alloy material being able to be replaced.

A further advantage of the proposed composite wire is, in particular, that the electrical and/or thermal properties of the composite wire can be modified in wider ranges than conventional single-material wires. In particular, the properties can be altered or set by the composition of the copper alloy and/or the composition of the steel or the steel alloy being altered or varied, and/or the thickness of the copper alloy layer being altered.

Figure 3:
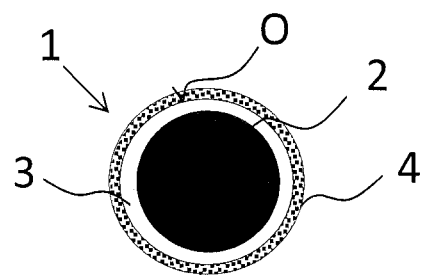
FIG. 3 a cross section of a composite wire as per a second embodiment.

Further possible variations of the properties of the composite wire are obtained, in particular, by one or more metallic coating(s) 4 or nonmetallic coating(s) being/having been applied to the outer surface O of the copper alloy layer 3. Such a composite wire 1 is shown in cross section in FIG. 3.

A metallic coating 4 can, for example, have been applied as functional layer to the copper alloy layer 3. In particular, application of a metallic coating 4 makes it possible to prevent the composite wire having exposed copper alloy surfaces, which can be disadvantageous, for example in respect of corrosion, etc. As regards the functional layers, reference is also made to what has been said above.

Typical embodiments of metallic coatings 4 are, for example, tin plating, nickel plating, silver plating or gold plating of appropriate surfaces. The coated surfaces can then be employed, in particular, for electric and/or mechanical contacting or joining and be, for example, soldered, welded or clamped.

Nonmetallic coatings can, for example, have been applied for tarnishing protection, for electrical insulation or for other purposes.

It should be noted that nonmetallic coatings can likewise be applied on top of a metallic coating which has been applied to the copper alloy layer. However, this is not shown in the figures.

Methods of coating with nonmetallic, organic or inorganic materials include, for example, painting or dipping, with the layers applied by painting or dipping being able to be dried in subsequent steps in order to adhere firmly to the composite wires.

Varnish wires can, for example, be used as winding wires in electric motors, with the varnish being able to serve as electric insulation. Other chemical coatings can, for example, serve to influence the tribological behaviour of the composite wires by modifying the frictional properties of their surfaces.

Overall, it has been found that, depending on the particular industrial use for the composite wire proposed herein, it is possible to find suitable materials combinations of core wire and surface(s) in order to be able to meet relevant industrial requirements for the composite wire.

In particular, even in view of the drastic increase in price on raw materials markets, in particular for metals such as copper, the composite wire proposed herein allows, in particular, a cost reduction, with, as mentioned above, particularly advantageous flexibility and variability in respect of the mechanical/electrical and/or thermal properties being able to be achieved at the same time.

The composite wire proposed here can be effectively tailored in respect of the physical/technical properties, making it possible to achieve, in particular, new types, i.e. types which could not hitherto be obtained, of wires having new types of physical and/or technical properties or property combinations by means of new materials combinations, in particular with simultaneous cost optimization.

The novel combination of bronze or brass strip or tube with a steel core (cladding) proposed and made possible herein for the composite wires makes it possible to produce many different types of wire, each having specific properties. Suitable types of bronze are, for example, CuSn5, CuSn6, etc.

Possible types of steel are in particular, as mentioned above, low-carbon steels, in particular the steel grades 1002, 1005, 1006, 1010, or stainless steel, in particular the types 1.4301, 1.4306, 1.4401, 1.4404.

The structure proposed here for the composite wire makes it possible, in particular, to influence or set the mechanical properties by means of the material of the core 2. Properties of the surface, in particular tribological and metallurgical properties, can be adapted and/or set by means of, in particular and inter alia, the copper alloy materials, in particular bronze or brass, applied to the core 2.

Since steels are significantly cheaper than bronze or brass, the composite wires proposed herein ultimately also lead, in general, to less expensive wires.

However, it should be mentioned that it is also possible to use a core composed of aluminium or an aluminium alloy instead of the core composed of steel or a steel alloy; in this case, the main issue is less the cost advantage and more the comparatively wide variability in the physical/technical properties of the composite wire and in particular a further large number of different wire types which can be produced.

The composite wires proposed by the present invention are fundamentally suitable as replacement for existing wires in the following applications:

general connecting wires;
connection wires, in particular for electronic components;
cable wires, in particular bunched, with or without plastic sheathing;
wires for cable strands;
plug-in pins for plug connectors, for example for plug connections in motor vehicle applications;
weaving wires;
woven wire meshes;
knitted wire meshes.

The composite wires proposed herein can also be used in fields in which the tribological, or even only the optical or visual, properties of the upper layer, i.e. the copper alloy layer, are of importance. For example, the proposed composite wires are suitable as replacement for conventional wires in the case of weaving wires, woven wire meshes and/or wire braids and the like, particularly when such woven meshes and/or braids assume sealing, sliding and/or spacer functions and when the tribological properties are of relevance.

The composite wires proposed herein are also a comparatively inexpensive replacement for conventional materials in fields in which the issue is more the mechanical properties or qualities, which can sometimes also be coupled with electrical properties or qualities. In particular, the proposed composite wires can also be used in the field of spring technology where the springs used should or are intended to perform compressive, clamping, tensile and/or holding functions, sometimes paired with electric contacting.

REFERENCE NUMERALS/SYMBOLS

1 Composite wire
2 Core
3 Copper alloy layer
4 Coating
O Surface

What is claimed is:

1. A contact element, comprising:
   a composite wire comprising: a core made of steel or a steel alloy; at least one copper alloy layer surrounding the core; and a metallic coating applied to the at least one copper alloy layer,
   wherein the contact element is configured as at least one of a connecting wire, a connection wire, a cable wire, a cable strand, a plug-in pin for plug connectors, a weaving wire, a woven wire mesh, a knitted wire mesh and a spring element.

2. The contact element according to claim 1, wherein a copper alloy forming the copper alloy layer comprises copper and tin or copper and zinc as main alloy components.

3. The contact element according to claim 1, wherein the composite wire is a round wire, four-layer wire or flat wire.

4. The contact element according to claim 1, wherein the metallic coating comprises at least one of the following elements: tin, nickel, silver, gold and alloys thereof.

5. The contact element according to claim 4, wherein said alloys comprise tin alloys or silver alloys.

6. The contact element according to claim 1, further comprising a nonmetallic outer coating.

7. The contact element according to claim 6, wherein said nonmetallic outer coating comprises at least one layer of electrically insulating material that is a layer of varnish, organic material or inorganic material.

8. The contact element according to claim 1, wherein the copper alloy layer is configured at least in parts as sheathing surrounding the core and has been applied in a cladding process.

9. The contact element according to claim 1, wherein the copper alloy layer is configured as an electrochemically applied layer, or as a layer applied as a melt or by sputtering.

10. The composite wire according to claim 1, wherein the core is made of a low-carbon steel or of stainless steel.

11. The contact element according to claim 1, wherein a specific electrical conductivity of the core is in a range from 7 m/ohm mm$^2$ to 10 m/ohm mm$^2$, when the core is made of low-carbon steel and in a range from 1 m/ohm mm$^2$ to 2 m/ohm mm$^2$, when the core is made of stainless steel.

12. The contact element according to claim 11, wherein the specific electrical conductivity of the core is about 8.3 m/ohm mm$^2$ when the core is made of low-carbon steel.

13. The contact element according to claim 1, wherein said contact element comprises at least one of an electric contact element and a mechanical contact element.

\* \* \* \* \*